UNITED STATES PATENT OFFICE.

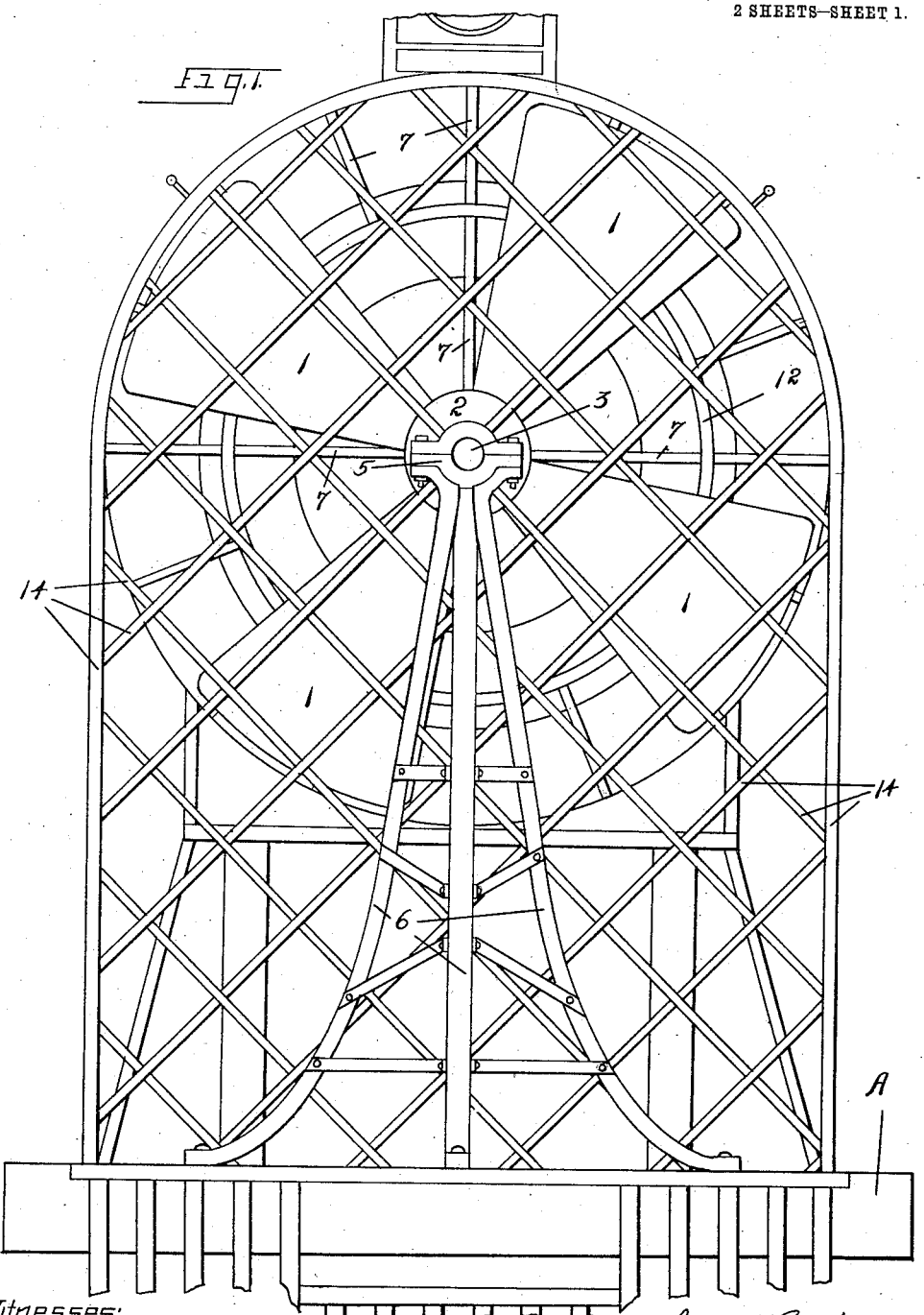

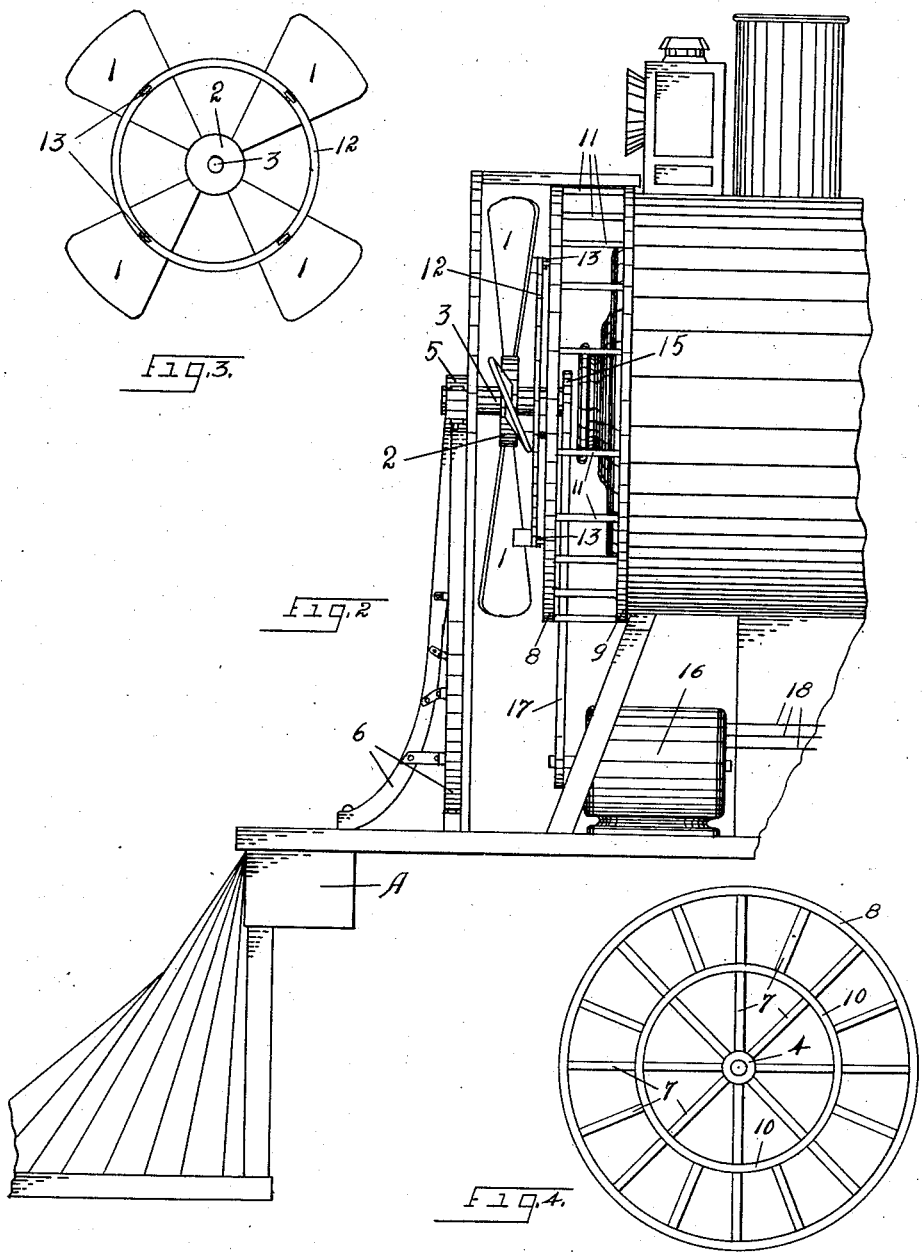

ALFRED BEST, OF SALT LAKE CITY, UTAH.

POWER-GENERATING APPARATUS.

1,062,815.  Specification of Letters Patent.  Patented May 27, 1913.

Application filed May 13, 1912. Serial No. 697,090.

*To all whom it may concern:*

Be it known that I, ALFRED BEST, a citizen of the United States, residing at Salt Lake City, in the county of Salt Lake and State of Utah, have invented certain new and useful Improvements in Power-Generating Apparatuses, of which the following is a specification.

My invention relates to power apparatuses; and has for its object to generate power by means of a wind wheel carried on a moving vehicle, and particularly has reference to generating power by a wind wheel mounted on a moving locomotive, and thereby to utilize the power needed to overcome the head resistance of a moving train. These and other objects which will be apparent, I accomplish with the device illustrated in the accompanying drawings, and as described in the specifications forming a part of this application, and as specifically pointed out in the appended claims.

Figure 1 is a front elevation of the apparatus, as secured on the front of a locomotive, parts cut away. Fig. 2 is a side elevation of the same, parts cut away. Fig. 3 is a rear view of the wind wheel and circular brace thereon, with the attached roller bearings. Fig. 4 is a front view of the track on which said roller bearings are made to operate, with the supporting frame thereunder.

My purpose is to utilize the lost energy required to overcome the head resistance of a moving train, by placing a wind wheel in front of the locomotive. To combat the head resistance on the train by and through said wind wheel, instead of with the front of the boiler and other parts of the locomotive. When the power is generated, it may be used for various purposes and may be applied through different mechanical devices; preferably to generate electricity through a dynamo, which is operated by said wind wheel. In order to secure a constant current for use when needed storage batteries are used in connection therewith.

My apparatus consists of a wind wheel having a plurality of vanes or wings 1, which are set at an angle on the hub 2. Said hub is keyed on or may be formed integral with the shaft 3, which shaft is mounted in the front bearings provided therefor. The front bearing 5 is supported by the braces 6, which are bolted on the top of the pilot beam A of the locomotive. The rear bearing 4 is formed around the center of a supporting frame, which is attached to the front of the locomotive boiler. Said supporting frame consists of radially disposed braces 7, and circular members 8 and 9. On the front side of said braces 7 is secured the circular track 10, and between the said circular members 8 and 9 are horizontally disposed braces 11. The supporting frame in addition to forming a base for the said track 10 and bearing 4 enables me to attach my apparatus to locomotives having different shaped boiler heads. Secured to the rear edges of the said vanes 1 is a circular brace 12, preferably of the same diameter as said circular track 10, on which are mounted the roller bearings 13. A coarse meshed screen 14 is fastened over the wheel to prevent injury to or by said wheel. The said shaft 3 extends through the said rear bearing 4, and a pulley 15 is keyed on said extension. A dynamo 16, for generating electricity, is fastened on said locomotive adjacent said wind wheel, and a belt 17 incloses the said pulley 15 and a pulley on the dynamo, whereby motion imparted to said wind wheel is transmitted to the dynamo. Current carrying wires 18 connect said dynamo with storage batteries on the train. The said track 10 and roller bearings 13 furnish a support to the outer portions of said vanes 1, which support allows the wind wheel to be forced through the air at the speed of a rapidly moving locomotive, and permits the rapid revolutions of said wheel without injury thereto.

As will be obvious the power generated by the wind wheel, may be imparted to or used on air compressors, pumps, fans or other machinery.

Having thus described my invention I desire to secure by Letters Patent and claim:—

1. A power generating apparatus consisting of a wind wheel mounted on a locomotive and adapted to rotate when forced through the air by the running of said locomotive; a shaft in said wheel; a journal bearing for said shaft secured to the front of said locomotive; a supporting frame in which the other end of said shaft is mounted; a circular track on said frame; roller bearings on said wind wheel adapted to run on said track; and means to impart the motion of said shaft to other machinery.

2. In combination with a locomotive, of angled vanes secured in a hub; a shaft keyed therein and mounted on said locomotive; a supporting frame forming one of the bearings for said shaft and which is secured on the front of said locomotive; a circular track on said frame; roller bearings on said vanes adapted to run on said circular track; a pulley on said shaft; a dynamo fastened on said locomotive adjacent said pulley; and means to transmit the motion of said pulley to said dynamo, as and for the purposes described.

In testimony whereof I have affixed my signature in presence of two witnesses.

ALFRED BEST.

Witnesses:
BEN L. CORUM,
H. H. HOLDAWAY.

Copies of this patent may be obtained for five cents each, by addressing the "Commissioner of Patents, Washington, D. C."